United States Patent [19]
Campbell, Jr. et al.

[11] Patent Number: 5,875,792
[45] Date of Patent: Mar. 2, 1999

[54] BENDABLE FOAM COVERED ROD-LIKE ARTICLE AND METHOD AND APPARATUS FOR MAKING SAME

[75] Inventors: Robert L. Campbell, Jr.; Steve A. Fox, both of Hickory, N.C.

[73] Assignee: Plastic Technology, Inc., Conover, N.C.

[21] Appl. No.: 844,034

[22] Filed: Apr. 18, 1997

[51] Int. Cl.⁶ ..................................................... A45D 8/36
[52] U.S. Cl. ........................................... 132/246; 132/273
[58] Field of Search ................................... 132/246, 219, 132/245, 226, 252, 247, 273

[56] References Cited

U.S. PATENT DOCUMENTS

| | | |
|---|---|---|
| D. 284,117 | 6/1986 | Collis . |
| 1,619,743 | 3/1927 | McClaire . |
| 2,061,817 | 11/1936 | Van Cleef ................................ 132/246 |
| 2,542,601 | 2/1951 | Van Cleef ................................ 132/246 |
| 2,693,809 | 11/1954 | Spencer . |
| 2,757,676 | 8/1956 | Hamilton . |
| 2,838,054 | 6/1958 | Fischer . |
| 2,853,081 | 9/1958 | Brancaccio . |
| 3,228,398 | 1/1966 | Leonard et al. . |
| 3,837,351 | 9/1974 | Thornton . |
| 4,041,961 | 8/1977 | Shaler et al. . |
| 4,104,481 | 8/1978 | Wilkenloh et al. . |
| 4,107,354 | 8/1978 | Wilkenloh et al. . |
| 4,489,233 | 12/1984 | Glucksman ............................ 219/242 |
| 4,540,006 | 9/1985 | Collis ..................................... 132/246 |
| 4,577,647 | 3/1986 | Fenster et al. . |
| 4,648,414 | 3/1987 | Fox et al. ................................ 132/246 |
| 4,823,458 | 4/1989 | Hollenberg et al. .................... 132/246 |
| 4,834,118 | 5/1989 | Goeller ................................... 132/246 |
| 5,498,190 | 3/1996 | Ganson . |
| 5,664,589 | 9/1997 | Black ..................................... 132/246 |

FOREIGN PATENT DOCUMENTS 2 111 382  11/1982  United Kingdom .

*Primary Examiner*—Gene Mancene
*Assistant Examiner*—Pedro Philogene
*Attorney, Agent, or Firm*—Bell Seltzer Intellectual Property Law Group of Alston & Bird LLP

[57] ABSTRACT

Bendable foam-covered rod-like articles and a method and apparatus for their production are described. The method involves feeding an adhesive coated flexible core to an extruder, which in turn extrudes a low density, closed cell foam sheath about the core. The core and sheath composite is then cut into rod-like elements of predetermined length. Each of the rod-like elements is then restrained at a position spaced inwardly from one its ends, and an orificed plate and an element end are axially pressed together such that the core extends through the orifice in the plate and the foam sheath is compressed. The excess core extending through the plate orifice is then cut, and the pressure between the plate and the element is released, such that the foam sheath returns to its original condition, thereby producing a composite in which the core end is recessed into the foam sheath end. The end of the element is finished by sealing, preferably through the application of a hot brand. The process is repeated on the opposite end of the rod-like element, to thereby produce a core/foam sheath composite article having good bonding between the core and sheath, and in which the core is recessed from the sheath ends. In one form of the invention, the ends of the core are rounded prior to finishing of the article ends.

6 Claims, 3 Drawing Sheets

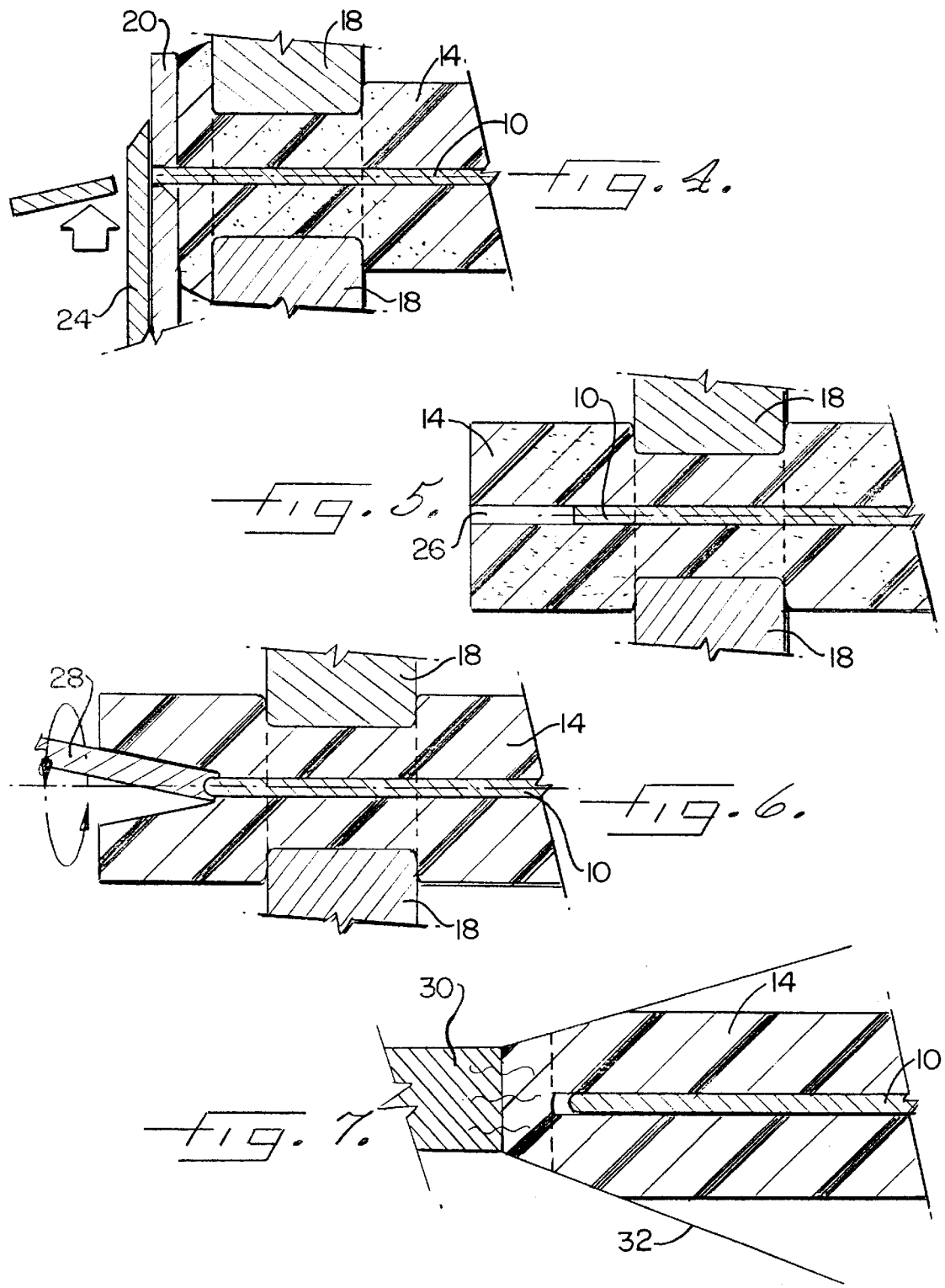

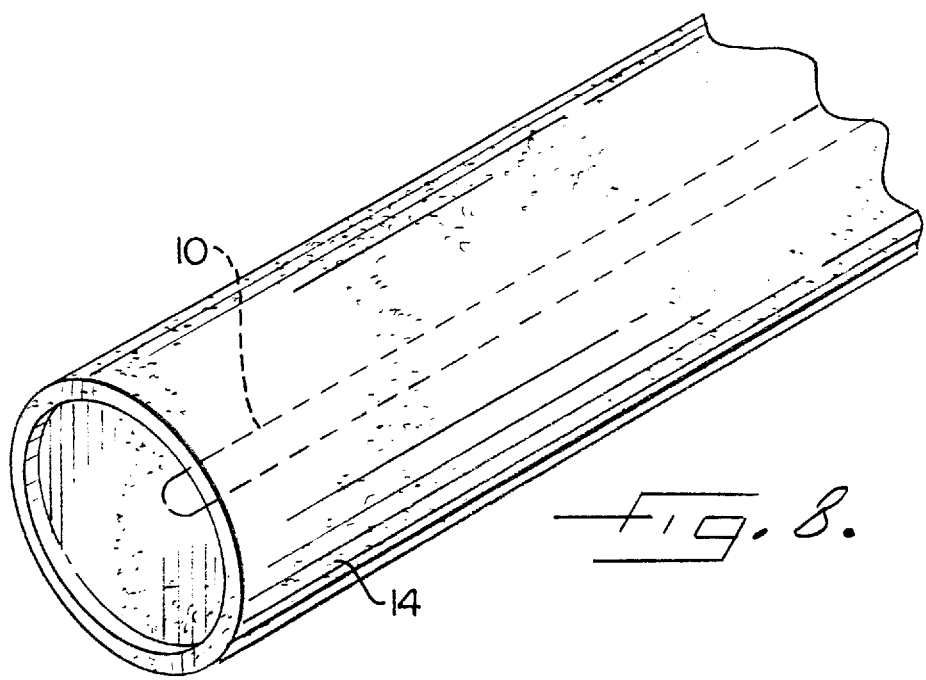

BENDABLE FOAM COVERED ROD-LIKE ARTICLE AND METHOD AND APPARATUS FOR MAKING SAME

BACKGROUND OF THE INVENTION

1. Field of the Invention

The invention generally relates to foam covered bendable rod-like articles and associated methods and apparatus. More specifically, the invention relates to bendable closed cell foam covered rod-like articles having specially constructed end portions.

2. Description of the Prior Art

Foam covered bendable wire products are commonly utilized in a variety of fields. For example, such devices are often used as hair curlers, holders for ponytails, and the like. Examples of such devices are described in U.S. Pat. No. 2,542,601 to Van Cleef and U.S. Pat. No. 4,577,647 to Fenster, et al. One problem typically encountered with such articles is that the wire core has a tendency to shift within the foam sheath; thus, the Van Cleef and Fenster, et al. patents describe structures designed to eliminate relative movement between the wire core and foam sheath. The Van Cleef patent describes a hair curler having a wire core with looped ends and a rubber sheath having knobbed ends for containing the looped ends of the wire core, in order to reduce the tendency of the wire core to shift within the rubber sheath. The Fenster, et al. patent seeks to overcome the problem of relative movement between a wire core and foam sheath by providing anchoring means on the core to assist in the core and sheath adjoinment; the anchoring means is described as being either bristle-type members extending from the core or a primer which reacts with the foam material. While such devices represent an improvement over prior art methods, the curlers generally must be manufactured one-at-a-time (and thus are relatively expensive to produce), and relative movement between the core and sheath components tends to occur after the article has been used (i.e., bent and straightened) a number of times.

Foam covered wire products have also in recent times become popular as novelty items, such as novelty jewelry, toys and the like. Such novelty articles are typically produced according to one of two methods. In the first method, a version of which is described in U.S. Pat. No. 5,498,190 to Ganson, a hollow foam tube is produced to have an opening which approximates the size of a wire core which is to be inserted. A wire core is cut to a length which is somewhat shorter than the length of the hollow foam tube, and the ends of the wire core are usually rounded in a conventional manner to eliminate their sharpness. The core is coated with an RF activated adhesive, and the thus-coated wire core is inserted into the hollow foam tube (usually manually) such that the wire core is centered along the foam tube length. As a result, the wire core ends are recessed within the respective corresponding ends of the foam tube. The adhesive is then activated to secure the wire core to the foam tube. The ends of the foam tube can then be treated and a brand applied to the end face of the foam tube to enclose the wire core. While the resulting product has the safety advantages of a recessed wire core which optionally has dull ends, it is often difficult to get a good bond between the wire core and foam tube. As a result, the wire core has a tendency to separate from the foam tube (particularly following the repeated bending and straightening which the article undergoes during use) and it can slide out, thus destroying the product's utility. In addition, the assembly process requires matching predetermined lengths of foam tube with slightly shorter predetermined lengths of wire, inserting and centering the wire in the foam tube, and then bonding the wire to the tube. These assembly steps are laborious and expensive, and cause assembly time to be great.

The second known prior art method of producing such articles is described in U.S. Pat. No. 4,648,414 to Fox, et al. The Fox, et al. patent describes an article having a pliable wire core and a closed cell foam sheath surrounding the core. The article is made by coating the wire core with an adhesive and feeding the coated wire core to an extrusion die, where a foam sheath is extruded about the core. The thus-coated core is then cut into rods of predetermined length, and hot thermoplastic end caps are bonded to the opposite ends of each of the rods. In the resulting article, the foam sheath and the wire core are coextensive in length, with the end caps serving to seal the rod ends and prevent liquid from coming into contact with the wire core. Further, the patent describes that the adhesive serves as a corrosion resistant protective coating for the wire core, as well as securing the wire core to the foam sheath.

While the article and the method of the Fox, et al. patent have been found to be useful in many respects (i.e., an excellent bond is obtained between the core and sheath and the cost of production is relatively lower than that of the first method described above), the wire core extends to the ends of the foam sheath and the ends of the wire core are squared-off rather than being rounded. The end caps are thus advantageously used to shield a user from exposure to the squared off ends of the wire core. However, the end caps add to the manufacturing cost and, once in use, can separate from the article, thereby exposing a user to the wire core and the ends of the wire core to adverse influences such as moisture.

SUMMARY OF THE INVENTION

With the foregoing in mind, it is therefore an object of the present invention to provide a closed cell foam-covered bendable rod-like article which can be manufactured inexpensively and requires only a minimal number of production steps.

It is also an object of the invention to provide a method for forming a foam covered rod-like article where the ends of the core are safely retained within the foam such that they cannot injure a wearer or user.

It is a further object of the invention to provide a method for making a foam-covered bendable rod-like composite article which resists separation of the foam and the core, even following repeated bending and straightening of the article.

In addition, it is an object of the present invention to provide a closed cell foam-covered bendable rod-like article in which the core ends are safely encapsulated and which retains a strong bond between the flexible core and foam sheath throughout a number of bendings and straightenings.

These and other objects are met by the method, article, and apparatus of the instant invention as follows. A flexible core is advanced from a supply source through an adhesive coating apparatus which applies an adhesive coating to the flexible core. In a preferred form of the invention, the adhesive coating is applied so as to continuously surround the flexible core. The thus-coated core is then fed through an extrusion die where a low density closed cell foam sheath is extruded about the core and bonded thereto by way of the adhesive. Thus, a continuous foam-covered flexible composite is produced.

The thus-produced covered core is then cut to produce a plurality of rod-like elements of predetermined length. To finish its ends, the element is secured in a fixed position, such as by clamping it within the jaws of a vise at a position on the rod-like element spaced inwardly from the end to be finished.

A plate having an orifice which is substantially the same size and dimension as the diameter of the flexible core plus the adhesive coating is aligned against the element such that the orifice is longitudinally aligned with the core. One of or both of the element and the plate is moved relative to the other such that the foam sheath is compressed while the core extends outwardly through the plate orifice. The portion of the core extending outwardly from the plate is then cut and removed, and the pressure of the plate against the covered core is then released such that the foam returns to substantially its original, decompressed condition by way of its inherent recovery properties. Alternatively, the end of the core extending through the plate orifice can be ground, rounded, or otherwise shaped (as opposed to cut and removed) to smooth and/or shorten the core end.

The process is likewise performed on the other element end. As a result, the core is shorter than the foam sheath such that the flexible core ends are recessed within the foam sheath. In a preferred form of the invention, the ends of the core are also smoothed at this time by way of an orbital riveting head or the like. Alternatively, the portion of the flexible core extending through the plate can be cut at a position spaced from the plate and the remaining portion can be smoothed in a conventional manner to remove sharp edges. The ends of the element are then sealed to enclose the ends of the flexible core, preferably by contacting the sheath ends with a torch or hot brand.

BRIEF DESCRIPTION OF THE DRAWINGS

FIG. 4 is a cross-sectional view of the foam covered core and apparatus from FIG. 3, illustrating the cutting and removing of the portion of the core which extends through the plate orifice following compression of the foam sheath;

FIG. 5 is a cross-sectional view of the foam covered core and apparatus from FIG. 4, illustrating the foam covered core as it appears when the compression of the plate is released, with the foam sheath assuming its pre-compression position;

FIG. 6 is a cross-sectional view of the foam covered core from FIG. 5 as it appears when the core end is being rounded by way of an orbital riveting head;

FIG. 7 is a cross-sectional view of the foam covered core from FIG. 6, as it appears when the end is being sealed by a hot brand apparatus; and FIG. 8 is a perspective view of an end portion of a finished article, with the flexible core illustrated in phantom lines.

DETAILED DESCRIPTION OF THE INVENTION

Figure 1:
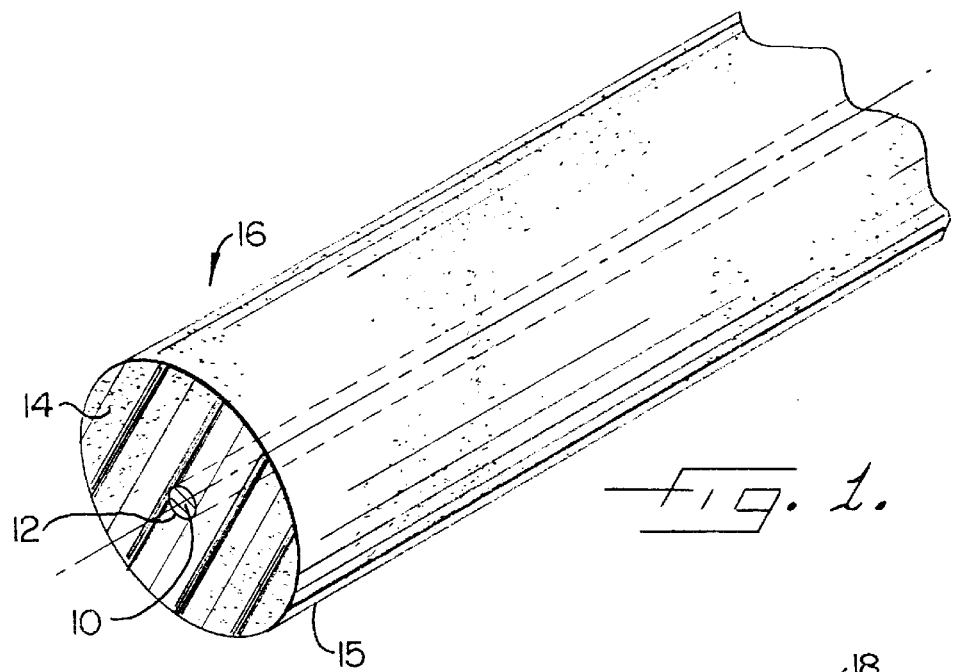
FIG. 1 is a perspective view of an end portion of a foam covered core according to the instant invention, prior to the end shaping and sealing steps of the method.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to the drawings, the method of the instant invention is performed as follows. A flexible core 10 is advanced from a supply source through an adhesive coating apparatus which applies an adhesive coating 12 to the core, in a manner like that described in the above-referenced U.S. Pat. No. 4,648,414 to Fox, et al., which is incorporated herein by reference.

Although the core is illustrated as being a cylindrically shaped monofilament type core, it is noted that cores having a non-cylindrical cross-section, and those formed of more than a single core strand, can also be used within the scope of the present invention. Similarly, the core can be of any desired diameter and flexibility. Particularly preferred for use as a core, and especially when the article is designed to be used as a children's toy, is a core material which is relatively easy to bend, yet is sufficiently rigid that it retains the finished article in a position in which it is contorted until sufficient force is applied to bend the article into a new position. In other words, in many embodiments of the invention, it is desirable to use a core which can be posed, and which retains its position until it is re-posed. In other embodiments of the instant invention, it is desirable to use a flexible core which can be bent, but which has a tendency to regain its original configuration without the application of additional force; in other words, the core has a tendency to spring back to its original configuration after the posing force is removed, either rapidly or over a period of time.

In a preferred form of the invention, the adhesive coating 12 is applied so as to continuously surround the core 10. The flexible core 10 is desirably formed from a core material such as soft aluminum, stainless steel, copper or the like, or a non-metallic but flexible material such as fiberglass (e.g., metallic cores are generally used in the posable embodiments of the invention, while fiberglass is generally used as the core in the article which is designed to spring back to its original configuration without the application of force.)

The adhesive preferably includes or consists substantially entirely of ethylene acrylic acid copolymer (EAA), ethylene methacrylic acid, ethylene ethyl acrylate, or ethylene vinyl acetate. One EAA found to be useful in the method of the instant invention is manufactured by Dow Chemical Co. under its product number Dow EAA 455. The adhesive is desirably formed as a coating having a thickness equal to about one-tenth to one-seventh the diameter of the core being used; however, as will be readily appreciated by those of ordinary skill in the art, other ratios of adhesive thicknesses can be used, provided the adhesive is capable of securing a foam sheath to a core in the manner discussed below.

The adhesive-coated core 10 is then fed through an extrusion die where a foam sheath 14 is extruded about the core and bonded thereto by way of the adhesive. Thus, a continuous strand of foam covered flexible core composite is produced. Particularly preferred for the sheath is a low density, closed cell foam material. Although the sheath is illustrated as being substantially cylindrical, it is to be noted that the sheath can be in a non-cylindrical form within the scope of the present invention. The foam sheath also desirably completely surrounds the core, and can be of any desired diameter and proportional diameter to the core, depending on factors such as the anticipated end use of the article being produced, strength and flexibility of the core being covered, and the like. For example, where the article is intended to be used as novelty jewelry, it is generally preferred that the overall article have a diameter of about one inch or less. The article could also be used as a tie member for tying other articles together, and thus the diameter of the foam would be dependent on the amount of cushioning desired for the tied articles. Likewise, where the article is intended for use as a swimming pool toy, article diameters of at least about three inches are generally preferred. Furthermore, a single sheath can be extruded about more than one spaced apart core to produce band-shaped composite articles or to provide additional rigidity to the finished article.

Although the method of extruding the foam material to an adhesive-coated flexible core has been discussed above as being performed in a manner like that described in the Fox, et al. patent, is to be noted that the method and article of the instant invention can be performed using other types of foams, cores and adhesives as well as adhesive and extruding methods, such as those commonly known for forming other types of foam-covered flexible cores (e.g., those used in the formation of coaxial cables.) Two patents describing such processes are U.S. Pat. No. 4,104,481 to Wilkenloh, et al., and U.S. Pat. No. 4,107,354, also to Wilkenloh, et al., both of which are incorporated herein by reference. It is particularly preferred to use an adhesive and extrusion process which tends to result in the structural integration of the adhesive within a radial inner portion of the foam sheath, as this has been found to provide particularly durable securement of the core and sheath; for example, an EAA adhesive which reacts at elevated temperatures such as those provided by the foam material during the extrusion of the foam sheath can be used to achieve a strong bond between the core and sheath. The extrusion of the foam directly to the adhesive-covered core provides a much stronger and more durable bond than the above-mentioned RF activated adhesive method where a foam tube has been fully formed and cooled before the core is adhered thereto.

In a preferred form of the invention, the closed cell foam sheath has a specific gravity of about 0.05 to 0.15 grams/cc, and more preferably a specific gravity of about 0.10 to 0.15 grams/cc. A conventional resin found to be useful in forming the closed cell foam is a polyethylene resin having a melt index of 2.0 and a density of 0.92 grams/cc. A blowing agent, nucleator, and/or color pigment can also be added to the polyethylene resin to provide the desired foam characteristics and color in a conventional manner; e.g., based on the weight of the polyethylene resin, 5% of a blowing agent, 1% talc can be used as a nucleator, and ½ oz. color pigment can be added to achieve a colored foam product. Other closed cell foam compositions (e.g., polyolefin) can be used within the scope of the invention, with the type of foam used being selected to provide the desired rigidity, compressiveness, buoyancy, and the like.

The foam sheath 14 is also desirably formed with an integral liquid impervious skin-like outer surface 15 by the extrusion process in a known manner. The skin-like surface 15 can serve to resist absorption of liquids into the foam sheath, such as hair solutions which could shorten the life of the foam, or water, which could reduce the buoyancy of the article such as when the article is used as a swimming pool toy. The skin-like outer surface is preferably also provided with a pebbled surface in a conventional manner (such as by coalescence of collapsed foam bubbles on the foam sheath surface), with the pebbled surface serving to increase the frictional resistance of the outer surface of the article to facilitate easy finishing of the article and gripping of the finished article.

The thus-produced covered core is then cut to produce a plurality of rod-like elements 16 of predetermined length, an example of which is illustrated in FIG. 1. Although shown as being cut substantially perpendicularly to the longitudinal axis of the foam covered core 10, it is noted that other cutting angles or configurations could be used within the scope of the present invention. This cutting can be performed with any conventional apparatus, such as a knife, wire cutter, or the like. Further, the rod-like elements can be of various lengths as well as diameters, depending on the end use for which the article is designed. For example, where the article is to be used as a hair curler, it would desirably be about three to six inches in length, or if the article is designed to be used as a pool toy, it can be up to a number of feet in length (e.g., two to six feet.)

Figure 2:
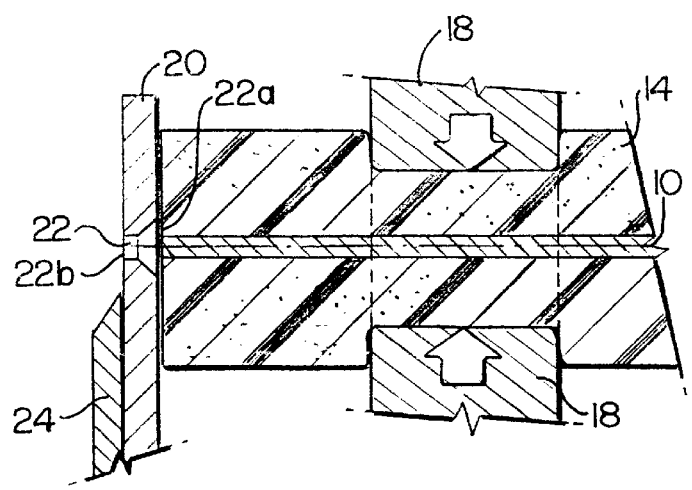
FIG. 2 is a cross-sectional view of the foam covered core of FIG. 1, as it appears when clamped within a vise and with an orificed plate and a cutting member positioned proximate the end of the foam covered core such that the core is longitudinally aligned with the plate orifice.

As shown in FIG. 2, one of said rod-like elements 16 is then secured in a fixed position. In a preferred form of the invention, the element 16 is secured by clamping it within a vise 18 at a position on the element spaced from the end thereof. A plate 20 having an orifice 22 which is substantially the size of the core 10 of the element is aligned against the end of the element such that the core is longitudinally aligned with the orifice in the plate. In a preferred form of the invention, the orifice 22 is tapered or graduated from a relatively wider mouth 22a proximate the vise 18, to a relatively narrower mouth 22b on the other plate side, remote from the vise. In this way, the alignment and feeding of the core 10 through the orifice 22 is aided. In this embodiment, however, it is desirable for each of the relatively wider and narrower mouths to be at least as large as the core which is to be received through the orifice in the manner discussed below.

One or both of the element 16 and the plate 20 are then advanced toward each other so that the foam sheath 14 is compressed while the core 10 extends outwardly through the orifice 22 of the plate 20. In the illustrated method of the invention, the rod-like element 16 remains fixed while the plate 20 is advanced toward it; alternatively, the plate can remain fixed while the vise 18 is advanced toward the fixed plate. As a further alternative, both the plate 20 and the element 16 can be advanced toward each other. In addition, it is not necessary that the element 16 remain relatively stationary, and it is within the scope of the invention that both the plate 20 and element 16 are moved in the same direction, but at slightly different speeds to effect the compressing action, in the nature of an "in-line", process.

Figure 3:
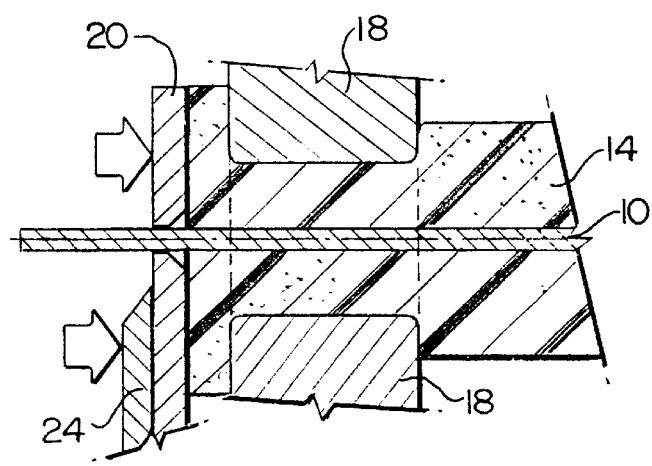
FIG. 3 is a cross-sectional view of the foam covered core and apparatus from FIG. 2, as they appear following compression of the foam sheath by the orificed plate.

FIG. 3 illustrates the extension of the core 10 through the orifice 22 as the bond between the foam sheath 14 and core is broken. A portion of the foam sheath 14 is stripped away from the core 10 as the portion of the core extends through the orifice 22.

In a preferred form of the invention which is illustrated in FIG. 4, the portion of the core 10 extending outwardly from the plate orifice 22 is then cut and removed using a conventional cutting member such as a knife, wire cutter, or the like. In a particularly preferred form of the invention, a knife 24 abuts the orificed plate 20 and slides directly along the plate when cutting the core 10, such that substantially the entire portion of the core which extends through the orificed plate is cut and removed. The pressure of the plate 20 against the covered core is released such that the foam sheath 14 returns to its original position by way of its inherent recovery properties. (See e.g., FIG. 5.) As a result, the core 10 has a shorter length than the foam sheath 14 in its decompressed state, such that the core end is recessed within the foam sheath, and a recessed channel 26 between the core end and the foam sheath end is defined.

In a preferred form of the invention, the end of the core 10 is smoothed at this time, in order to remove any sharp edges thereon and to otherwise blunt the end left by the cutting step. This increases the safety of the finished article by eliminating sharp edges, and can increase the lifespan of the finished article because a dull-ended core has less of a tendency to damage the foam sheath than a sharp-ended one. In a preferred form of the invention, this smoothing of the core end is performed by way of an orbital riveting head 28 or the like, such as that shown in FIG. 6. The orbital riveting head 28 has a cup-shaped bit which is rotatable about its axis and orbitally turned by way of a motor, to round off any sharp edges which may be present as a result of the cutting of the core. In this illustrated version of the invention, the orbital riveting head 28 is elongate, and is sized to extend into the recess channel 26 within the foam sheath 14. It is to be noted, however, that the cut end of the core 10 could also be smoothed using grinding or other techniques. Alternatively, after the core 10 is cut (and particularly when it is cut immediately adjacent the plate 20), the foam sheath 14 can be compressed further such that an additional portion of the core extends through the orificed plate; this portion of the end can then be smoothed in the manner discussed above prior to the release of the pressure between the plate and the foam sheath. In this method, the cutting member 24 is desirably either moved out of the path of the plate orifice 22, or the cutting member contains an opening which is adapted to align with the plate orifice, so that the core can extend through both the orificed plate 20 and the cutting member during the smoothing process.

In an alternative method of the invention, the core 10 can be clipped at a position spaced slightly from the orificed plate 20, and the end of the core left extending from the plate orifice can be rounded prior to the separation of the plate 20 and element 16, and decompression of the foam sheath 14. As a further alternative, the core 10 end can be ground, rounded, or otherwise shaped (as opposed to cut and removed) to smooth and/or shorten the core end.

The ends of the article are then sealed in order that the core 10 is enclosed, and preferably entirely surrounded, by the material of the foam sheath 14. The sealing can be done in a conventional manner, such as by contacting the foam sheath ends with a torch or hot brand 30, which at least partially melts the sheath ends so that they encapsulate the core 10. In the sealing method illustrated in FIG. 7, the end of the element to be finished is forced into a conical end-shaping device 32, which compresses the foam sheath material together over the end of the core 10. The end of the conical end-shaping device is left open, and a hot brand 30 is inserted into the open end to partially melt and seal the end of the element 16 to encapsulate the core 10. Although described as being conical, it is to be noted that any shape or device for compressing the foam sheath can be used within the scope of the instant invention. By using the material of the foam sheath 14 to seal the ends of the element, the need for thermoplastic end caps such as those described in the Fox, et al. patent can be obviated. The finishing process is likewise performed on the other end of the rod-like element, either simultaneously with or subsequent to the finishing of the first end.

The above-described method thus can rapidly produce a number of foam-covered rod-like articles 32 (as shown in FIG. 8) using only a minimal number of production steps. The thus-produced article has enhanced safety over prior art structures due to the rounded core ends, the core being recessed within the foam sheath, and the complete encapsulation of the core by the foam sheath. Furthermore, because the foam sheath is extruded to the flexible core (as opposed to being produced as separate subsequently joined elements), the foam sheath can closely surround the core, and the extra space which is required in the prior art foam tube and wire core assembled devices is neither needed nor produced. In addition, it has been found that the adhesive which is coated on the core becomes integrated into a radially inner portion of the foam sheath during the extrusion process, thereby providing a durable and strong securement of the core and sheath.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A bendable foamed-covered article comprising:

a flexible core having a definded length and including a central portion and opposing ends, said ends being rounded and having a diameter which is not substantially greater than a diameter of said central portion;

an adhesive coating bonded to said core, and a low density, closed cell foam sheath extruded against the adhesive-coated core such that the adhesive coating is structurally intergrated with a radially inner portion of said sheath, said sheath defining a second defined length which is greater than said defined length of said flexible core such that said opposing ends of the core are recessed within the foam sheath, and wherein said foam sheath includes opposed ends and said opposed ends are sealed to enclose said core within said foam sheath.

2. An article according to claim 1, wherein said core is entirely encapsulatedby the low density, closed cell foam sheath.

3. An article according to claim 1, wherein said core comprises fiberglass.

4. An article according to claim 1, wherein said core comprises metallic wire.

5. A bendable rod-like article having a flexible core and a foam sheath produced by the method comprising the steps of:

advancing a continuous flexible core along a predetermined path of travel;

applying an adhesive coating to the flexible core;

feeding the thus-coated core to an extruder;

extruding a foam sheath about the core with the extruder to foam a composite structure defining a central axis;

cutting the composite structure to form predetermined lengths of discrete rod-like elements each having opposed ends defined by the axially coextensive ends of the core and sheath;

securing each respective rod-like element in a fixed position;

pressing an orificed plate and one of the ends of the foam sheath of the rod-like element against each other in an axial direction such that the respective end of the foam sheath is compressed and the corresponding end of the core extends through the orifice of the plate;

cutting and removing the portion of the core end extending through the plate orifice;

releasing the pressure between the plate and the foam sheath such that the sheath decompresses to extend beyond the core end;

pressing an orificed plate and the other of the ends of the foam sheath of the rod-like element against each other in an axial direction such that the respective end of the foam sheath is compressed and the corresponding end of the core extends through the orifice of the pate;

cutting and removing the portion of the core end extending through the plate orifice;

releasing the pressure between the plate and the foam sheath such that the sheath decompressed to extend beyond the core end;

smoothing each of the ends of the core such that each end has a diameter which is not substantially greater than a central portion of the flexible core; and sealing each of the ends of the foam sheath to enclose the core ends within the foam sheath.

6. A bendable, rod-like article having a flexible core and a foam sheath made by the process comprising the steps of:

providing a continuous composite structure including a foam a sheath extruded about a flexible core and defining a central axis;

cutting the composite structure to form predetermined lengths of discrete rod like elements each having opposed ends;

positioning an orificed plate against one of the ends of said element such that the plate orifice is axially aligned with said core;

compressing the orificed plate against the end of the foam sheath of the composite structure such that a corresponding end of the core extends through the plate orifice;

cutting and removing a portion of the core end extending through the plate orifice, to thereby shorten the length of the core;

releasing the compression of the plate against the foam sheath such that the sheath returns substantially to its original orientation and the core end is recessed within the foam sheath;

smoothing the end of the core with an orbital riveting head such that the core end has a diameter which is not substantially greater than that of the core; and sealing the end of the foam sheath such that the core end is enclosed within the foam sheath.

* * * * *

UNITED STATES PATENT AND TRADEMARK OFFICE
CERTIFICATE OF CORRECTION

PATENT NO. : 5,875,792
DATED : March 2, 1999
INVENTOR(S) : Campbell, Jr. et al.

It is certified that error appears in the above-identified patent and that said Letters Patent is hereby corrected as shown below:

Column 8, line 29, "definded" should read --defined--; line 36, "intergrated" should read --integrated--; line 45, "encapsulatedby" should read --encapsulated by--;

Column 9, line 15, "pate" should read --plate--; line 19, "decompressed" should read --decompresses--.

Column 10, line 2, after "foam" cancel "a"; line 5, "rod like" should read --rod-like--.

Signed and Sealed this

Tenth Day of August, 1999

*Attest:*

Q. TODD DICKINSON

*Attesting Officer*     *Acting Commissioner of Patents and Trademarks*